(12) United States Patent
Harris

(10) Patent No.: US 8,499,023 B1
(45) Date of Patent: Jul. 30, 2013

(54) SERVLET-BASED GRID COMPUTING ENVIRONMENT USING GRID ENGINES AND SWITCHES TO MANAGE RESOURCES

(75) Inventor: Lyle T. Harris, Portland, OR (US)

(73) Assignee: Oracle America, Inc., Redwood City, CA (US)

( * ) Notice: Subject to any disclaimer, the term of this patent is extended or adjusted under 35 U.S.C. 154(b) by 2014 days.

(21) Appl. No.: 11/087,420

(22) Filed: Mar. 23, 2005

(51) Int. Cl.
    *G06F 15/16* (2006.01)
    *G06F 15/177* (2006.01)

(52) U.S. Cl.
    USPC .......................................... 709/201; 709/220

(58) Field of Classification Search
    USPC ................ 709/201, 238; 705/26, 30; 713/182
    See application file for complete search history.

(56) References Cited

U.S. PATENT DOCUMENTS

| | | | | |
|---|---|---|---|---|
| 5,838,916 | A * | 11/1998 | Domenikos et al. | 709/219 |
| 5,950,008 | A * | 9/1999 | van Hoff | 717/139 |
| 6,011,916 | A * | 1/2000 | Moore et al. | 717/104 |
| 6,065,043 | A * | 5/2000 | Domenikos et al. | 709/203 |
| 6,289,105 | B1 * | 9/2001 | Murota | 380/286 |
| 6,301,267 | B1 * | 10/2001 | Ben-Ami | 370/468 |
| 6,356,937 | B1 * | 3/2002 | Montville et al. | 709/206 |
| 6,363,398 | B1 * | 3/2002 | Andersen | 707/103 R |
| 6,643,708 | B1 * | 11/2003 | Francis et al. | 709/246 |
| 6,732,101 | B1 * | 5/2004 | Cook | 707/10 |
| 6,760,752 | B1 * | 7/2004 | Liu et al. | 709/206 |
| 7,130,891 | B2 * | 10/2006 | Bernardin et al. | 709/218 |
| 7,266,582 | B2 * | 9/2007 | Stelting | 709/201 |
| 7,293,059 | B2 * | 11/2007 | Pearson | 709/201 |
| 8,135,841 | B2 * | 3/2012 | Bozak et al. | 709/226 |
| 2002/0007453 | A1 * | 1/2002 | Nemovicher | 713/155 |
| 2002/0026487 | A1 * | 2/2002 | Ogilvie et al. | 709/206 |
| 2002/0059144 | A1 * | 5/2002 | Meffert et al. | 705/51 |
| 2003/0046533 | A1 * | 3/2003 | Olkin et al. | 713/152 |
| 2003/0196080 | A1 * | 10/2003 | Karman | 713/150 |
| 2004/0030893 | A1 * | 2/2004 | Karamchedu et al. | 713/168 |
| 2004/0064824 | A1 * | 4/2004 | McNeely et al. | 719/316 |
| 2004/0117661 | A1 * | 6/2004 | Karaoguz et al. | 713/201 |
| 2004/0139314 | A1 * | 7/2004 | Cook et al. | 713/151 |
| 2004/0143787 | A1 * | 7/2004 | Grancharov et al. | 715/501.1 |
| 2004/0181469 | A1 * | 9/2004 | Saeki | 705/30 |
| 2004/0199633 | A1 * | 10/2004 | Pearson | 709/226 |
| 2004/0215590 | A1 * | 10/2004 | Kroening | 707/1 |
| 2005/0021594 | A1 * | 1/2005 | Bernardin et al. | 709/200 |
| 2005/0027785 | A1 | 2/2005 | Bozak et al. | |
| 2005/0027863 | A1 | 2/2005 | Talwar et al. | |

(Continued)

FOREIGN PATENT DOCUMENTS

WO     WO 97/04194    *   9/1997

*Primary Examiner* — Guang Li
(74) *Attorney, Agent, or Firm* — Marsh Fischmann & Breyfogle, LLP; Kent A. Lembke

(57) ABSTRACT

A method for providing a lightweight grid computing environment. The method includes providing a web server running on a computer device and a grid engine on the web server that is adapted for processing grid compute requests from user programs. The grid engine receives a grid compute request from a user program that is processed by the grid engine to identify a client program available in the grid and a path in the grid to the client program. The method includes loading and running the client program with the grid engine to generate a client program output for transmittal to the user program. The grid compute request includes a URL request string including a name of the client program and the path to the client program and may also include a name of the computer device hosting the web server and a path to the grid engine.

10 Claims, 7 Drawing Sheets

U.S. PATENT DOCUMENTS

| | | |
|---|---|---|
| 2005/0044251 A1 | 2/2005 | Bozak et al. |
| 2005/0050183 A1 | 3/2005 | Hansen et al. |
| 2005/0060237 A1* | 3/2005 | Barsness et al. ............... 705/26 |
| 2005/0066056 A1* | 3/2005 | Dominic ...................... 709/245 |
| 2005/0080923 A1* | 4/2005 | Elzur .......................... 709/238 |
| 2005/0120073 A1* | 6/2005 | Cho ............................. 709/201 |
| 2005/0246547 A1* | 11/2005 | Oswald et al. ............... 713/182 |
| 2006/0047850 A1* | 3/2006 | Singh Bhasin et al. ....... 709/238 |
| 2006/0143350 A1* | 6/2006 | Miloushev et al. ........... 710/242 |

* cited by examiner

SERVLET-BASED GRID COMPUTING ENVIRONMENT USING GRID ENGINES AND SWITCHES TO MANAGE RESOURCES

BACKGROUND OF THE INVENTION

1. Field of the Invention

The present invention relates, in general, to grid computing systems and environments, and, more particularly, a servlet-based method and corresponding system for processing requests to grid resources and managing access to grid resources and transmission of resource inputs and outputs in a lightweight manner that is not specific to a particular grid implementation or programming language.

2. Relevant Background

In the computer industry, grid computing is growing in popularity to address the growing demands for on demand processing power and capability. Grid computing is a form of distributed computing in which computing resources are shared by numerous users and in many cases, the computing resources are shared across networks and across a diverse geographic area. Grid computing facilitates selection, aggregation, and sharing of computing resources resident in multiple administrative domains and across geographic areas. The sharing may be based upon availability, capability, and cost of the resources available in a grid as well as on a user's quality of service requirements and users functional demands.

If managed properly, grid computing can result in reduced cost of ownership, aggregated and improved efficiency of computing, data, and storage resources, and enablement of virtual organizations for applications and data sharing. For example, in a grid computing environment, all of the disparate computers and systems in an organization or among organizations can be organized and managed as a grid to become one large, integrated computing system. That single integrated system can then handle problems and processes too large and intensive for any single computer of the organization or organizations to easily handle in an efficient manner.

While providing many advantages, grid computing is not being used optimally and continues to challenge the computing industry. Implementation and administration of grid-based computing is often difficult and cumbersome. Further, few standards have been implemented for grid computing and many of the implementation and administration environments or technologies are proprietary to a particular company, such as a software or hardware development company. Another problem with grid computing is that programmers wishing to use grid resources usually need to learn some additional, grid-specific software programming language to take full advantage of the grid implementation. To make matters worse, the programmer may have to contort or modify their program or programs in an undesirable manner to use the grid resources. The programmer may also be forced to segment their data to effectively use the resources which may create a difficult task of processing the split data that is returned from the grid resources. Additional frustrations are caused when the grid environment includes firewalls or HTTP proxy servers that can make it hard to establish direct connections between user devices and grid resources, such as grid-available client programs or services.

As a result of these problems or limitations with present grid computing environments, there remains a need for an improved grid computing environments that enhance the ability of users and programmers to access and effectively use resources in a grid. Preferably such a method, and related systems, would utilize non-proprietary technologies and programming languages and standard data transfer and communication protocols.

SUMMARY OF THE INVENTION

The present invention addresses the above and other problems by providing a method and corresponding systems for managing a grid computing environment using grid engines (e.g., GridServlets) and grid switches. The invention provides a grid computing network or system that is a ubiquitous fabric that a programmer can plug into to provide their client program or device as a grid computing resource. The use of grid packets and other data transmission techniques replaces the "grid" of prior systems with a "packet" computing paradigm. The method and system of the invention generally takes advantage of easily deployed, self-maintaining, readily understood web technology and object-oriented programming (such as Java programming or software) to implement a lightweight grid computing environment or system.

In one embodiment, the grid computing system utilizes a web server or web server technology with the addition of several special applications and/or objects, such as HttpServlets and associated Java classes, adapted to facilitate the deployment and execution of a user's software to a grid of computer systems. These applications may be labeled "grid engines" or "GridServlets" that respond to users' grid computing requests to load and execute client programs (or remotely run such programs) and "grid switches" that act as front end controllers to provide access to the grid engines and client programs (or grid resources). In one embodiment, the grid computing system is entirely Java based and in this case, the specific architecture of servers in the grid (or grid servers) is not limiting as was the case with prior grid computing systems. In some embodiments, native code is provided for specific architectures in other languages, such as C, C++, Fortran, or the like to take advantage of specific hardware and/or libraries. By using the method and system of the invention, implementing grid functionality becomes as easy as opening a URL connection. In addition, the inventive method and system allows grid computing to be accomplished on a network such as the Internet, by allowing grid compute requests to be made through both firewalls and HTTP proxies, thereby eliminating the need for a direct connection between a requesting user device or program and a client program or other grid resource (as was the case with prior grid computing systems).

More particularly, a method is provided for managing resources in a grid computing system. The method includes providing a web server running on a computer device on a digital communications network and providing a grid engine on the web server. The grid engine is adapted for processing grid compute requests from user programs. The method continues with the grid engine receiving a grid compute request from a user program. Then, the grid compute request is processed by the grid engine to determine a client program among the grid resources and a path in the grid to the client program. The method includes loading and running the client program on the computer device to generate a client program output which is then transmitted to the user program.

In one embodiment, the grid compute request includes a URL request string including a name of the client program and the path to the client program and may also include a name of the computer device hosting the web server and a path to the grid engine. The client program output may be transmitted to the user program as a data stream from the opened client program URL. The grid compute request may also including a parameter defining a data set and this data set is loaded to the web server for processing on by the client program run by the grid engine. The grid compute request may in some embodiments of the method include a grid packet that is a client processing program which can be run or processed by the grid engine to process a data set and the processed grid packet may be returned to the user program, stored for later retrieval by the user program, and/or transmitted to a grid end point device based on information/instructions in the grid compute request.

DETAILED DESCRIPTION OF THE PREFERRED EMBODIMENTS

Figure 1:
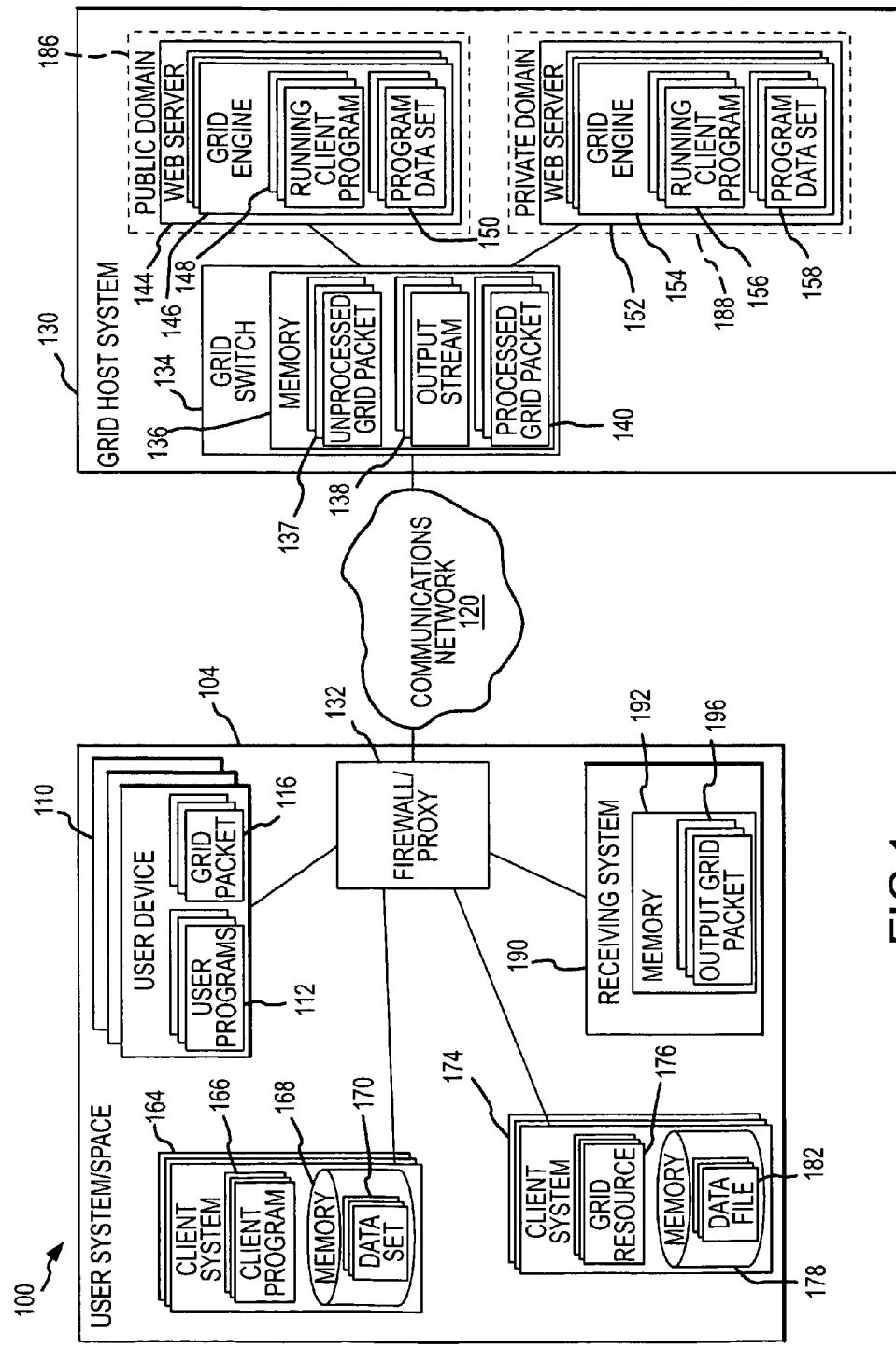
FIG. 1 illustrates a simplified grid computing system or network, adapted for managing access and use of grid resources according to an embodiment of the present invention.

In brief, the present invention is directed to a method of managing or operating a grid computing environment and associated grid computing systems that utilizes a grid engine or GridServlet configured to launch client programs or other resources of a grid.

In one embodiment, the grid engine acts to process grid compute requests that are generated by a user program and transmitted over a communications network, such as the Internet. The grid compute requests constructed by the user program in one embodiment are a Uniform Resource Locator (URL) that includes a host name of a server hosting the grid engine, a path to the grid engine, a name of a client program to run or grid resource to access, a URL path to the client program along with any other information or parameters needed by the client program (such as the location of a data set to process).

For example, the method and system of the invention may build on web server technology to provide the grid engine. In a Java-based implementation, the ability to serve servlets is added to the web server to provide the web server the ability to execute Java programs in response to requests made of the web server. Users (or user programs) of the grid computing system can either load their own particular Java programs via a servlet (i.e., the grid engine) and have the results returned to them, such as via an InputStream, or they can submit a small, packet type program (or "grid packet") to the grid engine to be processed by accessing (e.g., loaded on the web server hosting the grid engine or run remotely) client programs and then returned to them, such as in a Java object format or the like.

In the following discussion, computer and network devices (or "elements"), such as the software and hardware devices within the system 100, are described in relation to their function rather than as being limited to particular electronic devices and computer architectures and programming languages. Examples of implementations provided in the Java programming language are provided to more efficiently describe one useful embodiment of the invention but the invention is not limited to the Java programming language as those skilled in the art will readily understand how the Java-based examples can be applied in other languages and other architectures.

Further, to practice the invention, the computer and network devices or elements may be any devices useful for providing the described functions, including well-known data processing and communication devices and systems, such as application, database, web, blade, and entry level servers, midframe, midrange, and high-end servers, personal computers and computing devices including mobile computing and electronic devices with processing, memory, and input/output components running code or programs ("applications", "tasks" within such applications, and "services") in any useful programming language, and server devices configured to maintain and then transmit digital data over a wired or wireless communications network. Data storage systems and memory components are described herein generally and are intended to refer to nearly any device and media useful for storing digital data such as disk-based devices, their controllers or control systems, and any associated software. Data, including transmissions to and from the elements of the network 100 and among other components of the network/systems 100 in "templates" or otherwise, typically is communicated in digital format following standard communication and transfer protocols, such as TCP/IP, Hfrp, HTTPS, FTP, and the like, or IP or non-IP wireless communication protocols.

FIG. 1 illustrates a simplified grid computing network or system 100 that is adapted according to one embodiment of the invention for effectively for managing resources in a grid computing environment. The system 100 may take a variety of forms to practice the invention and generally, may be arrangement of computing and/or electronic devices that are communicatively linked by a wired or wireless communications network 120 (and network 160, which may be the same network such as the Internet as network 120 or a separate network such as a LAN, WAN, or the like).

As shown, the system 100 includes a user system or user space 104 with a number of user devices 110 linked to a grid host system 130 via the communications network 120. The user devices 110 may be nearly any computer or electronic device capable of interfacing with a network 120, such as the Internet. As shown, each user device 110 includes a user program 112 configured for generating grid compute requests and transmitting such requests to the grid host system 130 over the network 120. The user device 110 may also or alternatively be configured to generate and/or to submit a small program(s) such as the illustrated grid packet(s) to the grid host system 130 for processing (e.g., initially shown as unprocessed grid packets 137 in memory 136 of grid switch 134). Typically, the results or output from the grid compute request are transmitted to the user device 110, such as in an OutputStream in a Java-based embodiment.

In other cases, though, the results may be stored in the grid host system 130, such as output streams 138 or processed grid packets 140 in memory 136 of a grid switch 134 as shown or in separate memory of host system 130 (not shown), and such storage may be performed until the calling program 112 retrieves the output or results 138, 140 or in some embodiments, the results 138, 140 are later transferred to the user device 110 (such as based on a polling result indicating the user device 110 is able to receive the data over the network 120). In yet other cases, a receiving system or grid end point device 190 is provided on the network 120 in user space 104 and includes memory 192 to allow the system 190 to act as a repository for data output or output grid packets 196 from client programs or grid resources 166, 176. In other cases, the user program 112 may designate a grid end point to receive the output 196 and such end point may be another user program 112 on the network 120, a program or servlet provided for temporarily storing output 196 for later retrieval by the calling user program 112, or the like. As shown, one or more firewalls and/or proxies (such as an HTTP proxy or the like) 132 may be provided on the user device side of the network 120 to control access to and from the network 120.

As shown, the grid host system 130 may include one or more grid switches 134 in communication with the network 120 to receive grid compute requests from user program 112 after the requests are passed through the firewall/proxy 132. The grid switch 134 processes the grid compute requests to determine which web server 144, 152 to route the request, and such switching may be performed based on the request contents, based on a DNS round robin process, or other switching methodology. Generally, DNS round robin functionality is used for load balancing and fault tolerance between the user space and the grid switches. Users may reference a grid switch 134 (e.g., grid.companyname.com) which may have several IP addresses and the IP address returned rotates as shown in the following example (which shows two requests and shows addresses rotating between requests) through available addresses each time the grid switch 134 hostname is resolved to an IP address.

ultra1:/home/lyle $ nslookup www.cnn.com
Server: ns6.attbi.com
Address: 63.240.76.4
Non-Authoritative answer:
Name: cnn.com
Addresses: 64.236.24.28, 64.236.16.20, 64.236.16.52, 64.236.16.84, 64.236.16.116, 64.236.24.4, 64.236.24.12, 64.236.24.20
Aliases: www.cnn.com
ultra1:/home/lyle $ nslookup www.cnn.com
Server: ns6.attbi.com
Address: 63.240.76.4
Non-authoritative answer:
Name: cnn.com
Addresses: 64.236.16.84, 64.236.16.116, 64.236.24.4, 64.236.24.12, 64.236.24.20, 64.236.24.28, 64.236.16.20, 64.236.16.52

Each web server 144, 152 is configured to run or act as a grid engine (or GridServlet) 146, 154 (whose functions are explained in detail below). The grid engine 146, 154 acts in some cases to load and run client programs 148, 156 in response to grid compute requests routed to them by the grid switch 134. The grid engine 146, 154 may also load and/or generate program data sets 150, 158 which are processed or operated on by the running client programs 148, 156. The grid engines 146, 154 act to control access to grid resources and in this regard, are linked to client systems 164, 174 in user space 104 via network 120.

Each client system 164, 174 hosts or makes available one or more client program 166 and/or grid resource 176. These grid-available client programs 166 and grid resources 176 are called or requested by the user programs 112 via grid compute requests transmitted to the grid engines 146, 154. As part of the grid compute requests the user program 112 can indicate a data set or sets that should be utilized by or processed by the requested client program or resource 166, 176, and exemplary data sets 170, 182 are shown stored in memory 168, 178 on client systems 164, 174. Of course, the data sets 170, 182 may be provided on nearly any device accessible in the grid computing system 100 and are not required to be provided by client systems 164, 174. Further, user devices 110, receiving system 190, and client systems 164, 174 may be provided in separate systems/devices as shown or may be combined into one, two, or three systems.

Building on this general explanation of the components of an exemplary grid computing system 100, it may now be useful to more fully describe several of the more significant features of the system 100 to further explain how these features provide a lightweight grid computing environment. To simplify the description, the following detailed descriptions of the features are provided in a Java-based example but, again, the concepts described can readily be used with other programming languages.

Regarding first the client programs 166 of the system 100, a programmer or other entity wishing to utilize the grid 100 writes a grid client program 166 in Java that extends the basic capability of an HttpServlet, as will be readily understood for a skilled Java programmer. The programmer then implements all their grid client software as part of this program 166. As discussed above, data such as data sets 170, 182 for the grid client program 166 to process is input via HttpServlet mechanisms with a grid compute request from the user program 112 taking the form in one embodiment of a URL request string that started the HttpServlet grid client 166. Data to be returned to the main calling program 112 is returned via an OutputStream 138 from this program 166 (or running client program 148, 156) and a corresponding InputStream from the calling program 112. An alternative approach is for the user program 112 to extend and implement a GridPacket Class where the user's code is defined inside the extending Class and that Class is serialized as a Java object 116 and submitted for processing (e.g., unprocessed grid packets 137) by the user program 112 to the grid engine 146, 152 and then, returned 140 or 196 to the user program 112 or endpoint 190 when processing is completed. The client programs 116, 176 are made available to the grid engine 146, 152 via the network 120 in the grid computing system 100.

With the grid client programs 166 available on the grid 100, a user program or controlling program 112 can be written in Java and provided on a user device 110 linked to the grid host system 130 via network 120. The user program 112 is adapted to be able to initiate the grid client programs 166, 176 via or on any web server 144, 154 in which a grid engine 146, 156 is installed (assuming the user program 112 has access to the domain 186, 188 in which the grid engine 146, 156 resides as is explained below). During operation of the grid computing system 100, the user program 112 launches a grid client program 166, 176 by constructing a grid compute request. In one embodiment, the grid compute request is a URL which includes the name of the host 130 for the web server 144, 154, the path to the grid engine 146, 154, the name of the Java or client program 166, 176 to run, the URL path to the Java or client program 166, 176 to run, and any other information or parameters that the grid client program 166, 176 needs such as the location of any data set 170, 182 to process. The following is an example of such a grid compute request: http://GridHost/GridServlet?class=TestRun&classpath=http://MainHost/Classes/&data=file1.dat In this example request, the "GridHost" parameter is the name of the system 130 that contains the web server 144 or 152 that is or runs one of the grid engines 146, 154. The "/GridServlet" parameter is the path to the GridServlet or grid engine 146, 154 that enables the web server 144 or 152 to function as a grid server in the system 100. The "class=TestRun" portion or parameter tells the GridServlet or grid engine 146, 154 the location or place to load the TestRun Java program (class) or client program 166, 176 is at the URL "http://MainHost/Classes." This location is also the default location to look for any other files that are referenced but do not have an explicit path defined to them such as "datafile.dat" which is a parameter defined for the "TestRun" Servlet or client program 166, 176 to load the file "file.dat" as a dataset 170, 182 to process. Once the URL or grid compute request is constructed in the user program 112, it can be opened for reading which will cause execution of the client program 148, 156 to begin on the "GridHost" 130 in the above example and the results would be provided to the user program 112 via an InputStream from the opened URL.

The grid engine 146, 154 and grid client programs 166, 176 may also be written to provide real time interactive grid computing in the system 100 by adapting the client programs 166, 176 to receive their data set to process as an InputStream and to provide the results via an OutputStream 138. The grid engines 146, 154 in this example open as many client programs 166, 176 as necessary and when a compute request to process a data set 170, 182 is received from a user program 112, the grid engine 146, 154 writes it out via an OutputStream to a grid client program 166, 176 and then reads the results when they are ready via an InputStream. Data sets could be made of a stream of any combination of text or numerical data and could also be composed of serialized Java objects which encapsulate specific data and contain configuration, routing, and identification data.

More specifically, the user program 112 may create a Java Class called a "Grid Packet" 116 that contains specific, well-defined interfaces that a programmer can implement as a way of processing a quantum of their programs' processing requirements. For example, a large data processing problem can be broken up into numerous smaller processing problems and each data set can be encapsulated into a grid packet 116 for processing in the grid computing environment 100. The programmer does not have to define each grid packet 116 manually or specifically but the packets 116 instead are preferably created on-the-fly programmatically by the user program 112 by defining the data set as a subset or attribute of the grid packet 116 and then, using the corresponding methods of the grid packet object 116 to set the data set accordingly after creating a new one in a program. Once the grid packet 116 is defined, the programmer or user program 112 opens a URL connection to a grid switch 134 and then, serializes the grid packet object 116 into the grid switch 134 for processing by a grid engine 146, 154. The grid switch 134 then either looks for a grid engine 146, 54 to process the grid packet 116 or forwards it on to another grid switch (see, for example, FIGS. 4-7) if all known grid engines 146, 154 are too busy and the other switch has capacity; otherwise, the grid switch 134 saves the packet 137 until a grid engine 146, 154 becomes available either locally or remotely for processing the grid packet The grid engines 146, 154 (or GridServlets) are in one embodiment special HttpServlets that perform a variety of functions related to grid computing. The various functions available from this servlet 146, 154 are initiated by the particular parameters, such as HTTP parameters, passed to it in the grid compute requests from the user programs 112. Multiprocessor grid servers 144, 152 may be used in the system 130 and can be used efficiently by simply making another request, e.g., another HTTP request, of the grid engine 146, 154 on the same grid server 144, 154 processing different data or submitting another grid packet for processing.

The following is a description of some of the exemplary functions that may be carried out by the grid engines 146, 154. The grid engines 146, 154 typically function to load and execute client programs 148, 156, such as in the form of extended HttpServlet implementations. This allows users to execute their client programs 166, 176 on the grid engine 146, 154 by simply opening a URL connection to the servlet or engine 146, 154 with the correct parameters. The user program 112 may provide any additional information in the form of parameters in the HTTP request string or HTTP header that the program 166, 176 can use for processing or as meta data to retrieve other data remotely via a URL request from the servlet or client program 148, 156 running inside the grid engine 146, 154. The grid engines 146, 154 may also accept grid packets 116 from user programs 112 or grid switches 134, process the received grid packets, and then return the processed grid packets 140 to the requesting user programs 112, to the grid switches 134, and/or to grid end points 190. The grid engines 148, 156 may also provide system information such as: (a) number of CPUs available and number of jobs actually running; (b) CPU load; (c) a list of names of the grid domains 186, 188 that the grid engine 146, 154 operates in; and (d) the underlying architecture so that native libraries may be downloaded or made available to user programs or so that grid packets that require specific hardware dependent libraries may be run accordingly.

As discussed, some embodiments of the grid computing system 100 utilize grid packets 116 that make the system 100 able to packetize grid computing in the form of an abstract Java class. The grid packet class can be considered a grid client processing program that implements some specific capabilities, e.g., Java capabilities, that allow a connection to be open to the grid switch 134 (or directly to the grid engines 146, 154) and send the grid packet or Java class into the switch 134 as unprocessed grid packets 137 and then, receive the same grid packet or Java class 140 back after processing has been accomplished on it. This frees a programmer from having to open a specific URL connection to each grid engine 146, 154 and distribute the load amongst them. Preferably, the grid packets 116 are implemented with pre-defined methods in a Java class (such as the GridPacket Class) so that all grid packets 116 are treated similarly within the grid system 100.

The following is a list of methods and attributes/fields that the GridPacket Class may implement and those that would be implemented by the extending class or grid packets 116. For the GridPacket Class, the methods may include: (a) setDomain( )/getDomain( ) to set and get the name of the grid domain 186, 188; (b) setStatus( )/getStatus( ) to access the status of the grid packet which typically would return "true" if finished processing and "false" if not finished processing; (c) setPriority( )/getPriority( ) to manipulate the grid packets processing priority such as with an integer between zero and ten; (d) setReturnAddress( )/getReturnAddress( ) to manipulate the address where the grid packet is returned to after processing, e.g., if the value is set to "null" then the grid packet is returned to the calling program 112 (such as via the InputStream corresponding to the OutputStream that the grid packet was submitted by) otherwise the address is set to the URL of a web server or device 190 where the grid switch 134 posts the grid packet 196 (e.g., to a grid end point). Such an address could be a list to which a grid switch 134 could append its own address when forwarding the grid packet to a grid engine 146, 154, which allows the grid switch 134 to close the connection once the grid packet has been forwarded and then, the grid engine 146, 154 returns the grid packet to the switch 134 upon completion. Another setting may be used to indicate the grid switch 134 should store the grid packet 140, such as in its memory 136, for later collection by the user program 112 when it connects again to the network 120 and/or host system 130; and (e) setId( )/getId( ) to "sign" the packet so that it could be identified as originating from a specific user, which in some cases is used as part of a mechanism for retrieving stored grid packets 140 on a grid switch 134 by a user program 112 that had previously submitted grid packets 116. For the extending class grid packet 116, the following methods may be implemented: (a) Run( ) to be called to process the GridPacket and a user program 112 may call setStatus(true) just before this method returns; and (b) getProgress( ) which indicates the progress of processing the user program's grid packet 116, such as with integers between 0 and 100 being returned.

While not required in all embodiments of the system 100, a grid switch 134 may be included to manage access to grid engines 146, 154 and provide other grid computing functions. In one embodiment, the grid switch 134 is an HttpServlet that acts as a front end controller and access point for programs 112 to submit grid compute requests, e.g., a URL-based request or a servlet-based grid packet 116. The grid switch servlet 134 may run on the same web server 144, 152 as one of the grid engines 146, 154 or in a separate server and/or computer hardware device. The grid switch 134 receives a grid compute request via an HTTP and processes it to determine which engine 146 154 to transmit the request to in the host system 130. In the grid packet implementation, the grid switch 134 receives the request and reads in the serialized grid packet object 116, such as via an InputStream. The grid switch 134 then determines which among its known grid engines 146, 154 to send the grid packet to and then, sends the grid packet object to that grid engine 146, 154 for processing. In some cases, when processing is complete, the grid switch 134 receives the grid packet back from the grid engine 146, 154 and the grid switch 134 returns the processed grid packet 140 to the requester program 112, such as via an OutputStream 138. Depending on the options/parameters contained in the original grid compute request to the grid switch 134 by the user program 112, the results may be returned to the requester 112 via an OutputStream 138 from the grid switch 134 or the requester 112 may provide a URL or address to a grid end point 190 which the grid switch 134 could then itself open a URL connection to and deliver the results via an OutputStream 138. Another operating situation may involve the user program 112 specifying a parameter while submitting the grid packet 116 to indicate the user program 112 will disconnect after submitting the packet(s) and then reconnect later to receive the results. In this case, the grid switch would at least temporarily store the completed grid packets 140 in memory 136 until the user program 112 reconnects and asks for the completed packets 140 at which point the results would be returned to the user program 112 such as via an OutputStream 138.

As shown in FIG. 1, the grid computing system 100 may include grid domains 186, 188 in which the grid engines 146, 154 operate. A grid domain can be considered a name associated with each engine 146, 154 that indicates which domains 186, 188 the grid engine 146, 154 will process grid packets 116 or other grid compute requests for with the default being "public" as shown for domain 186. For example, a grid packet 116 may be submitted with a grid domain of "public" to a grid switch 134 and that grid switch 134 looks for a web server 144 running a grid engine 146 that processes packets of a public domain 186. In another example, there may be a pay-per-CPU portion of the grid computing system 100 that is delineated by the private domain 188 (e.g., having a grid domain of grid.company.com) which requires authorization and authentication in order to process a grid packet 116. Obtaining authorization key to place inside their grid packet 116 implementations for pay-per-cpu grid networks (such as private domain 188) may involve entering credit card information into a web site and receiving a key that is valid for a certain amount of CPU processing (such as for 100 hours of processing or some other number of hours or amount of processing). The grid switch 134 associated with the that network 188 would accept and debit the user's account as packets 137 were processed and then, stop processing packets 137 when the user's account balance reached zero.

A grid packet 116 with a grid domain of "grid.company.com" would be allowed in the private domain 188 to be processed assuming the authentication and authorization inside the grid packet 116 (i.e., a proper authorization key) was found acceptable (such as by the switch 134). The corresponding customer who submitted the grid packet 116 via user program 112 would be billed for the amount of CPU time incurred by processing the grid packet 116. A grid engine 146, 154 may be a member of two or more grid domains 186, 188, and in this case, typically one domain 186, 188, such as the private domain 188, has a higher priority than the other to handle competing requests from the user programs 112 for limited grid resources. Often the priority is based on the cost of processing or if a member of a private and public domain 186, 188, the switch 134 may route the request to the public domain 186 only when there are no pending private domain 188 requests pending.

The grid end point or receiving system 190 shown in FIG. 1 may include an HttpServlet that is provided by the requester or the user program 112 that accepts completed grid packets 196 from the grid switch 134 for storage in memory 192. The URL location of the grid end point 190 is provided as part of the parameter string of the grid compute request submitting the grid packet 116 to the grid switch 134 or as an attribute of a grid packet 116. The grid switch 134 operates to forward completed grid packets 140 to the grid end point web server 190.

Figure 2:
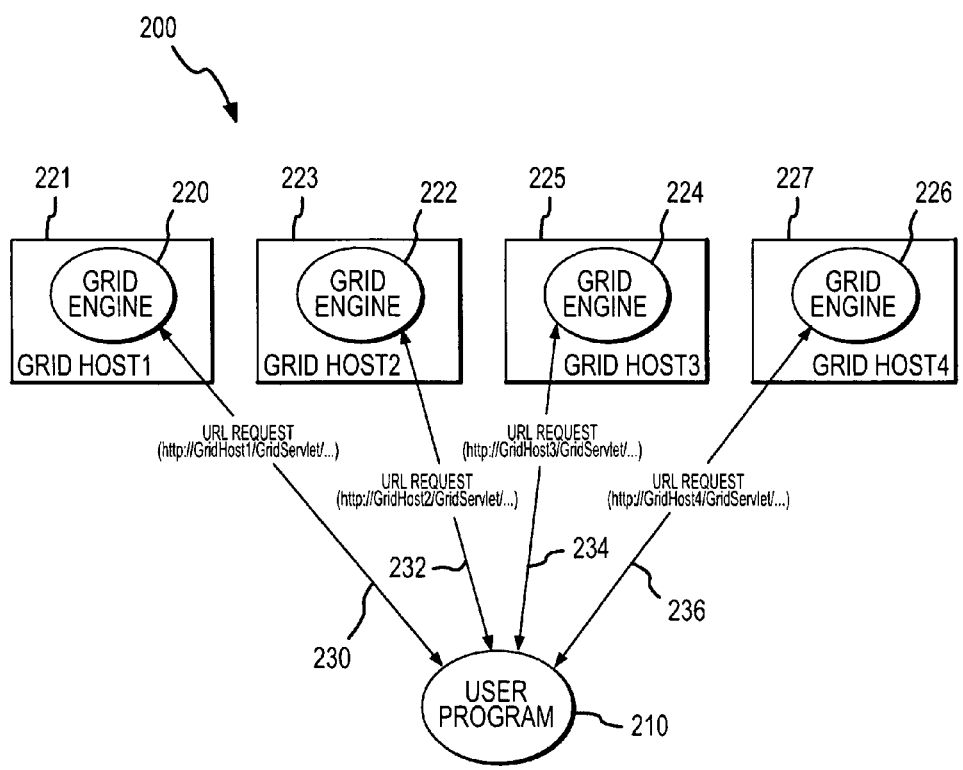
FIG. 2 illustrates in block diagram form a grid computing system (such as may be embodied in the system of FIG. 1) illustrating requesting grid resources or grid computing from a number of grid engines with a user program (such as the user programs of FIG. 1)

FIGS. 2-6 illustrate in more simplified block diagrams embodiments of edge computing systems according to the invention, such as may be incorporated in or provided by operation of the system 100 of FIG. 1. As shown in FIG. 2, an edge computing system 200 is provided in which a user program or main controlling program 210 is able to utilize effectively grid resources by transmitting grid compute requests over a communications link or network to a plurality of grid engines 220, 222, 224, 226 which are hosted on grid hosts 221, 223, 225, 227. As discussed with reference to FIG. 1, the user program 210 is adapted for generating each of the requests 230, 232, 234, 236 in the form of a URL request, which includes among other information the name of the system or host 221, 223, 225, 227 containing a grid engine and the path to the grid engine 220, 222, 224, 226. During operation of the system 200, the grid engines 220, 222, 224, 226 would process the URL requests 230, 232, 234, 236 to access/load grid resources such as client programs (not shown in FIG. 2) defined in the request and use the client programs to process parameters, data sets, and/or other information provided in the request. The output of the client program are transferred in this example directly back to the calling user program 210.

Figure 3:
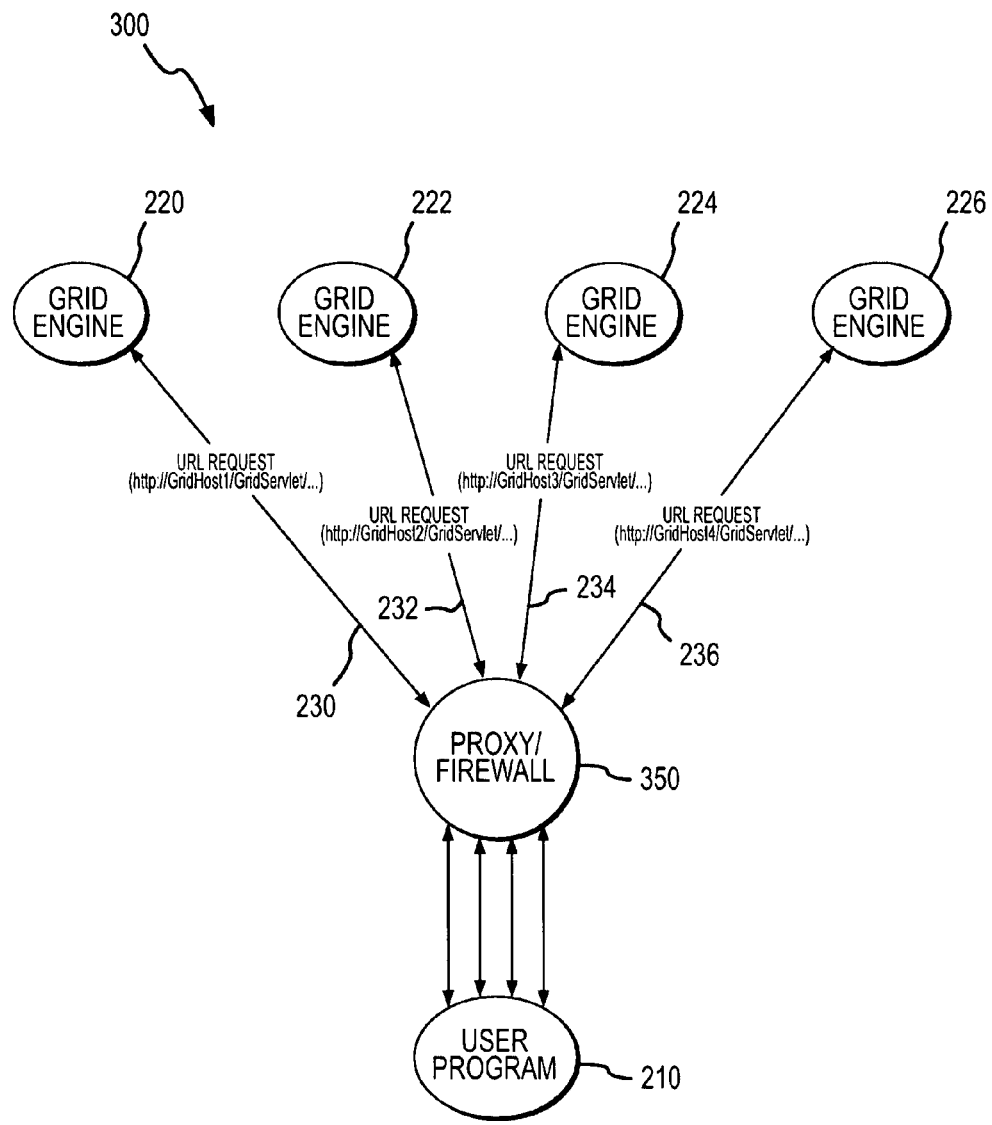
FIG. 3 illustrates a grid computing system similar to the system of FIG. 2 and further including a firewall and/or HTTP proxy between the user program and the grid engines (and, therefore, grid resources or services)
Figure 4:
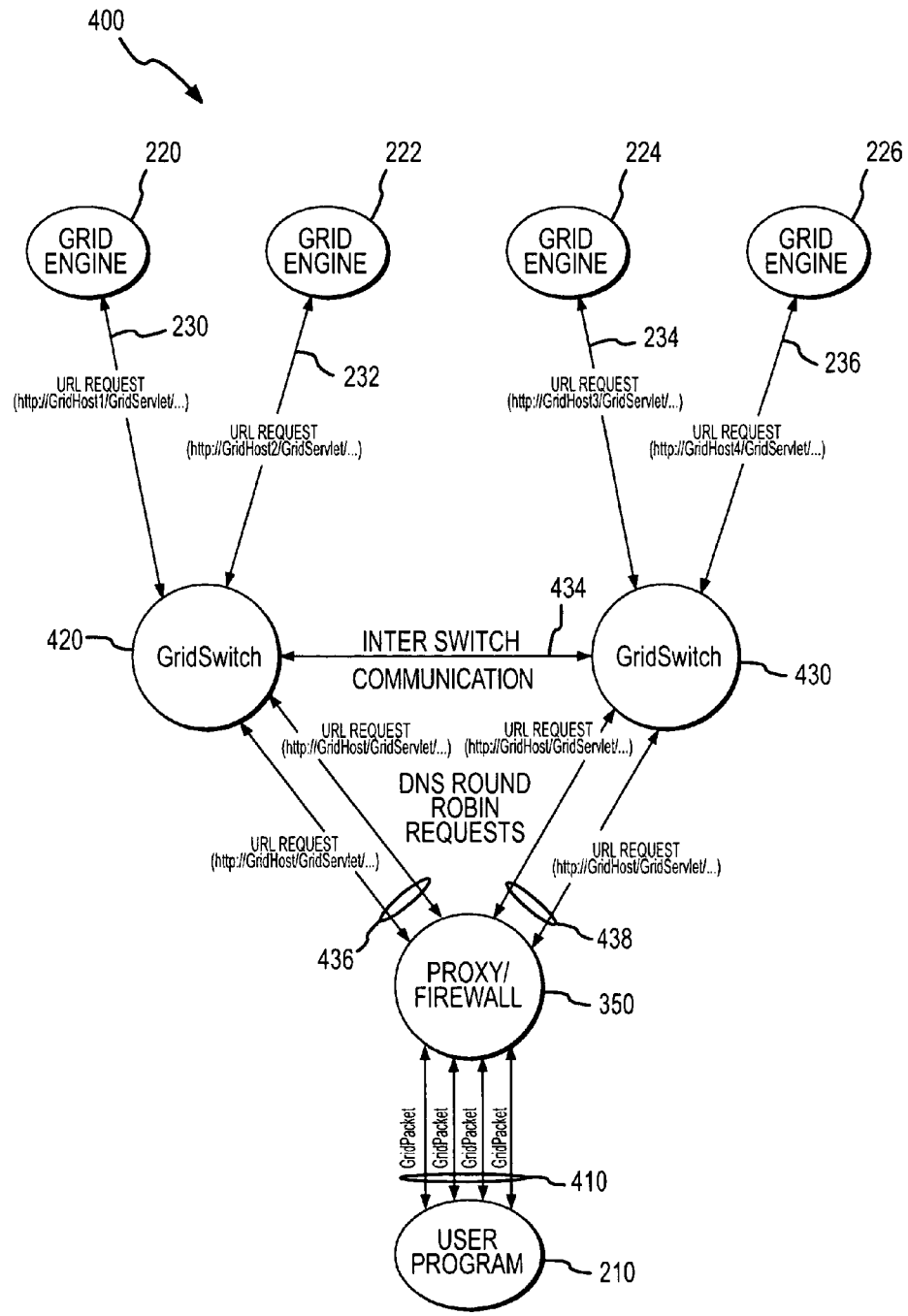
FIG. 4 shows another grid computing embodiment of the invention similar to the system of FIG. 3 and further including grid switches controlling access to grid engines (and their grid resources)

Often a firewall or HTTP or other proxy is provided on the user's system or network to keep their systems secure and to process and forward HTTP requests, respectfully. In this regard, FIG. 3 illustrates a grid computing system 300 similar to that of FIG. 2 but further including a proxy/firewall 350 that filters and forwards the grid computing requests 230, 232, 234, 236 transmitted by the user program 210. The URL requests 230, 232, 234, 236 are passed, when appropriate based on the firewall/proxy 350 restrictions, to the appropriate grid engines 220, 222, 224, 226 as defined in the requests 230, 232, 234, 236. The output of the grid engines 220, 222, 224, 226 also passes through the firewall/proxy 350 prior to being returned to the user program 210. More generally, firewalls are normally installed on the user's network to keep their systems secure The system 400 of FIG. 4 expands on system 300 by further including a pair of grid switches 420, 430 which communicate vie link 434. In other embodiments, more switches 420, 430 may be provided along with a greater number of grid engines 220, 222, 224, 226. Further, in the system 400, the user program 210 is shown to transmit grid compute requests 410 to the proxy/firewall 350 in the form of grid packets. The grid packets are routed by the proxy/firewall 350 as URL requests 436, 438 to one of the switches 420, 430, such as based on the results of DNS round robin requests or other selection techniques. The grid switches 420, 430 in turn process the requests 436, 438 to determine which of their engines 220, 222, 224, 226 to transmit requests 230, 232, 234, 236 and in some cases, this involves interswitch communications 434 to determine whether if the other switch has engines with less or no load (such as when the engines associated with a particular switch are determined to be "too" busy). Although not shown, the processed grid packets may be stored on one or both of the grid switches 420, 430 for later retrieval by the user program 210 or be transmitted directly back to the user program 210.

Figure 5:
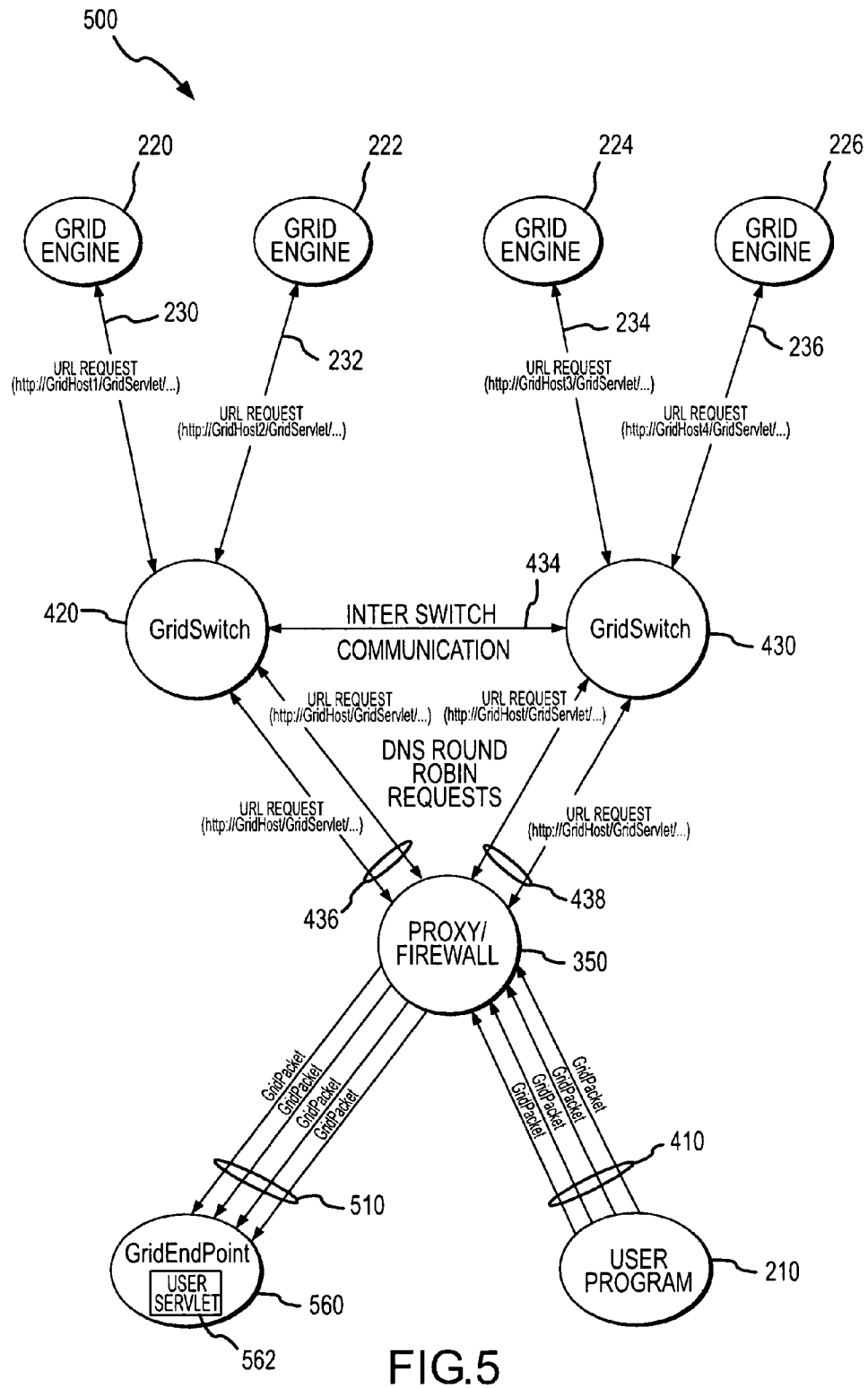
FIG. 5 illustrates yet another grid computing system of the invention similar to the system of FIG. 4 but further includes a grid end point for receiving/storing output streams or grid packets from the grid resources (e.g., client programs or the like)

FIG. 5 illustrates another exemplary grid computing system 500 in which the same components as shown in system 400 are provided but the system 500 is also configured to enable a user program 210 to define an output location or device for the output of the grid compute request. As shown, the user program 210 transmits a set of grid packets 410 to the grid engines or servlets 220, 222, 224, 226 via proxy/firewall 350 and grid switches 420, 430. The grid packets 410 include information that defines a device or service for receiving the processed grid packets 510. As shown, this receiving device or service is a grid end point 560 that is configured as a user servlet 562. In the system 500, the user program 210 can direct in the grid compute request (or grid packet) 410) where the results are to be sent in the system 500, and can send all to one grid end point 560 or to a plurality of end points and/or to the user program 210.

Figure 6:
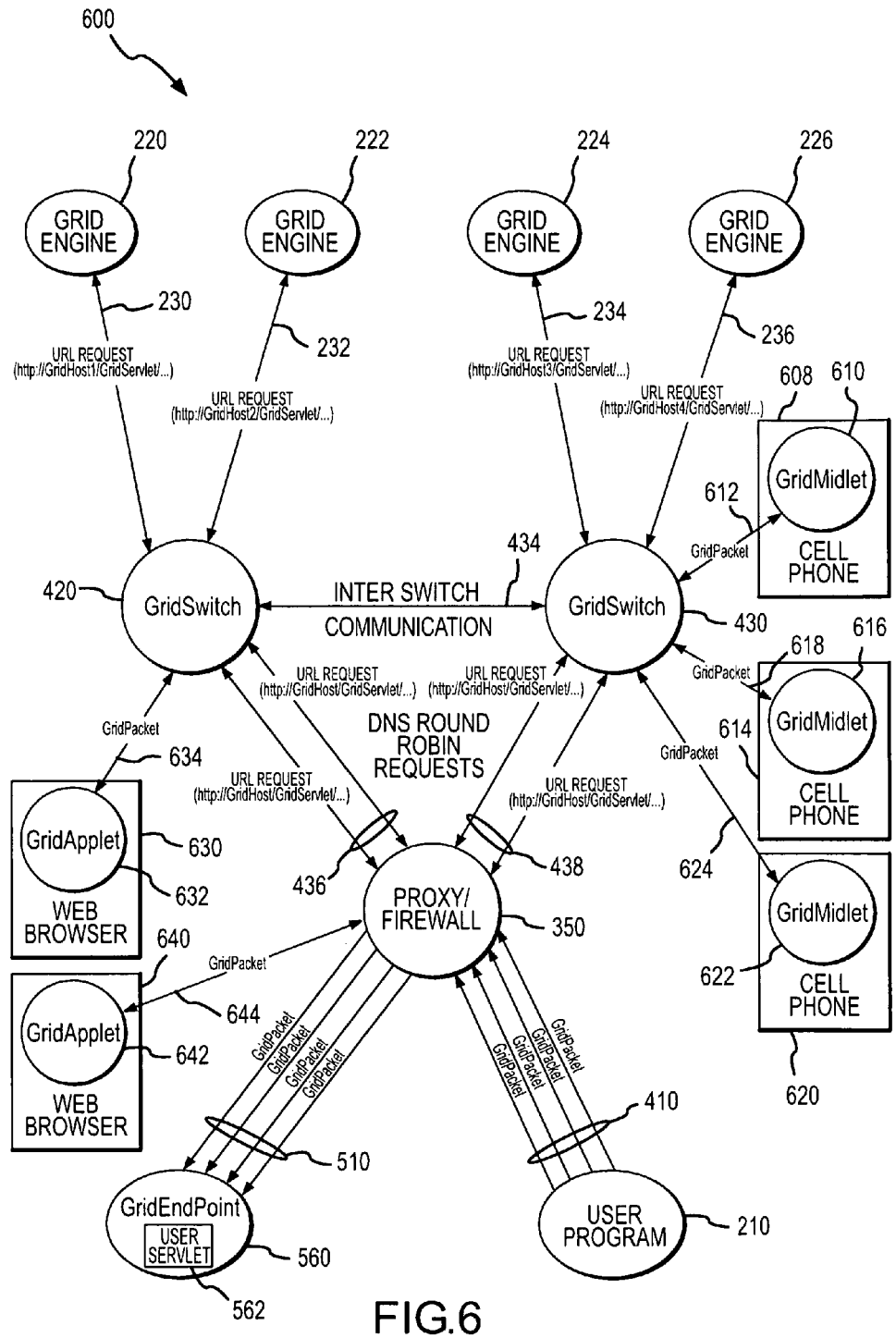
FIG. 6 illustrates another embodiment of a grid computing system according to the present invention that is shown to include "mini" grid engines to provide further access to resources in a public domain of a grid.

FIG. 6 illustrates yet another grid computing system 600 according to the present invention. The system 600 is similar to system 500 but further includes a number of other devices 608, 614, 620, 630, 640 which are linked to the grid switches 420, 430 and in some cases to the proxy/firewall 350. Devices 630, and 640 are shown to be web browsers (as an example) that act to receive, process, and return processed grid packets 634 and 644 with their user programs or grid applets 632, 642. A grid applet is typically an extension of a Java Applet that implements the same functionality as a grid servlet or grid engine for a public grid domain. Once connected to the grid switch 420, the web browser 630, 642 downloads a grid applet 632, 642 that begins running and registers itself with the grid switch 420 to start accepting public domain grid packets 634, 644.

In this manner, nonprogrammers and programmers can make their computers or other devices with browsers or similar applications available for processing public grid packets 634, 644, such as by using a Java-enabled web browser to connect to a grid switch 420, 430 directly or via a proxy/firewall 350. Once connected, the web browser 630, 640 would begin running the applet or engine 632, 642 which registers itself with a grid switch 420, 430 and the grid switch 420, 430 forwards public grid domain grid packets 634, 644 to the applet or engine 632, 642 for processing. Once the applet or engine 632, 642 has completed processing the grid packet, it would reconnect to the switch 420, 430 and submit the completed grid packet 634, 644. Such a use of devices 630, 640 may be thought of as a variation of "swarm computing."

The swarm concept can be expanded further as shown by linking other computing or electronic devices such as cell phones or the like 608, 614, 620 to the grid system 600. As shown, cell phones (or other similar devices) 608, 614, 620 are linked to switch 430. Each device 608, 614, 620 includes a GridMidlet or engine that implements the same or similar functionality as the grid engines 220, 222, 224, 226 for a public grid domain. For example, individuals with Java and web-enabled cell phones or other wireless or similar devices may "join the swarm" or grid 600 by connecting to a grid switch via a wireless access or other communication protocol. The engines 610, 616, 622 may then operate to download grid packets 612, 618, 624 to their host devices 608, 614, 620 to be processed and when completed, submit the packets 612, 618, 624 to the calling user program 210 via switch 430. In other embodiments of the system 600, the engines 220, 222, 224, 226 may be utilized to download and run client programs and to return output via streams as discussed with reference to the system 100 of FIG. 1.

Figure 7:
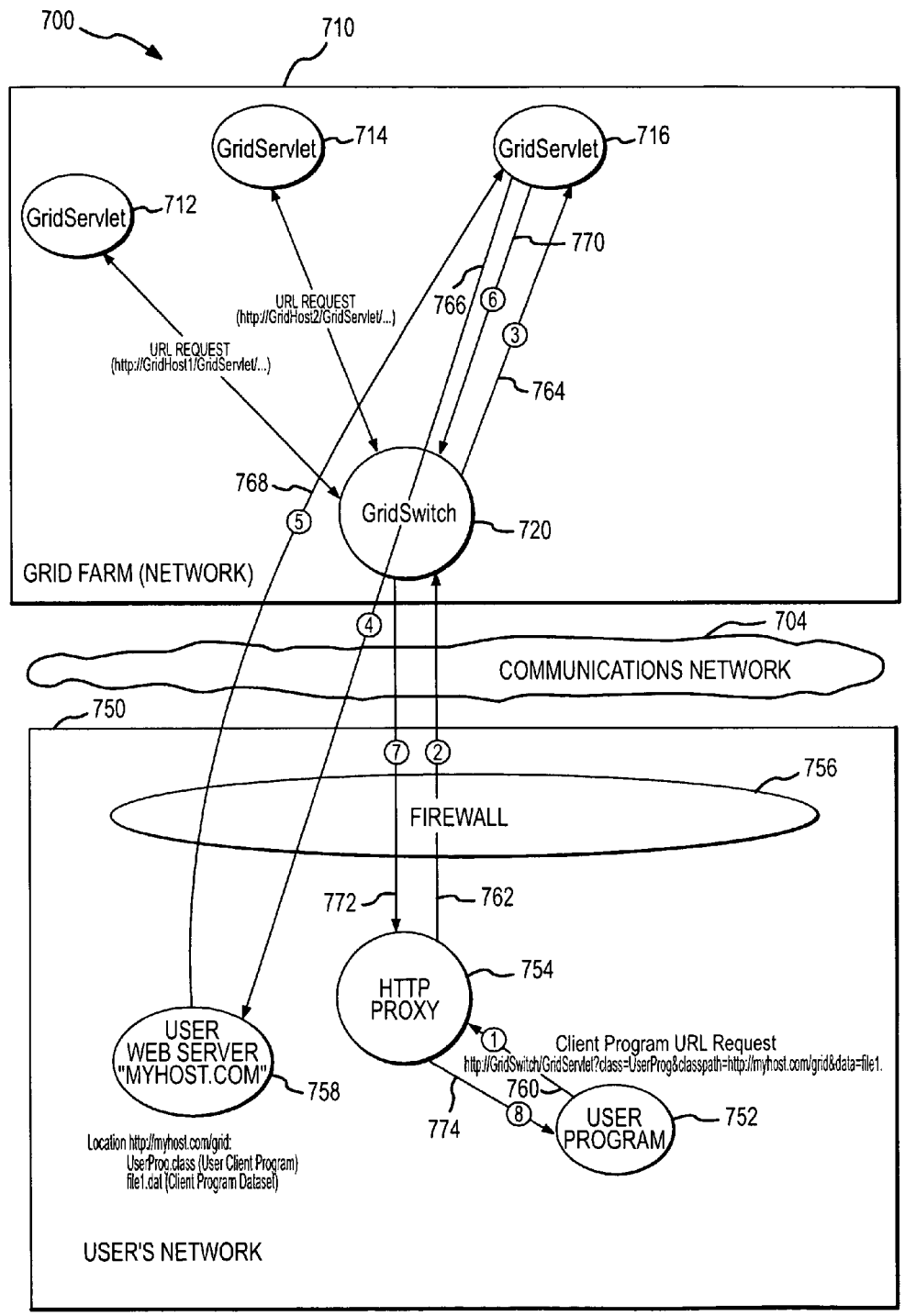
FIG. 7 illustrates still another embodiment of a grid computing system of the invention that more fully illustrates data flow between a user's network and a grid farm or network during operation of an exemplary grid computing system.

Although FIGS. 1-3 illustrate how the invention may be used to effectively provide grid computing by processing URL requests, it may be useful to provide another example a grid computing system 700 with reference to FIG. 7 to more fully describe exemplary operating and data flow according to the invention. As shown, the grid computing system 700 includes a gird farm or network 710 that is in communication with a user's network 750 via communications network 704. The grid farm 710 includes a number of GridServlets or grid engines 712, 714, 716 and a grid switch 720. The user's network 750 is shown to include a firewall 756 and an HTTP proxy 754 in addition to a user program 752 and a user web server (myhost.com), which is located at http://myhost.com/grid and serves user client program(s) ("UserProg.class") and client program data set(s) ("file1.dat" in this example).

During operation of the grid computing system 700, the user program 752 transmits at 760 a client program URL request defining the user client program and the path to the user client program and client program data set to be processed by the program. The client program URL request is processed and forwarded by the HTTP proxy and filtered by firewall 756 at 762 prior to being received at the grid switch 720. Based on the content of the received request 762, the grid switch forwards the client URL request at 764 to a particular one of the grid engines 716. The grid engine or GridServlet 716 loads client program based on the URL string in the client request. Specifically, at 766, the GridServlet 716 accesses the client web server 758 through the firewall to load at 768 the client program and client-specified data. The user or operator of the network 750 has to give access for the grid farm 710 or engine 716 through the firewall 756 or has to move server 758 in network 750 outside the firewall 756.

After loading the user's client program from server 758, the grid engine or GridServlet 716 calls the run( ) method of that program, which begins process the request. The results are returned to the requesting user program via an input stream as shown at 770, 772, and 774. The user's client program running on the grid engine 716 can typically also access its website (myhost.com) for the file 1.dat file (i.e., the client program data set) and any other ancillary programs and/or files (not shown). The client program being run on the GridServlet 716 can also access other websites for further data or to post processing results.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A computer-based method for operating a grid computing environment, comprising:
   providing a web server running on a computer device on a digital communications network;
   providing a plurality of grid switches for interswitch communication and receiving grid compute requests from a user program and routing the grid compute requests to a grid engine on the web server;
   processing the grid compute request with the grid engine to identify a client program and a path to the client program;
   loading and running the client program on the computer device to generate a client program output; and
   transmitting the client program output to the user program,
   wherein the grid compute request comprises a Uniform Resource Locator (URL) request string including a name of the client program and the path of the client program on a client system accessible by the web server via the communications network and
   wherein the transmitting of the client program output comprises providing a data stream to a grid end point accessible by the user program based on a URL opened by the grid engine based on the grid compute request.

2. The method of claim 1, wherein the URL request string further includes a name of the computer device containing the web server and a path to the grid engine.

3. The method of claim 1, wherein the path to the client program is a URL.

4. The method of claim 1, wherein the grid compute request further comprises a parameter defining a data set and wherein the loading and running of the client program further comprises loading the defined data set for processing by the client program.

5. A grid computing system, comprising:
   a plurality of client programs on client devices accessible on a grid network;
   a plurality of data sets stored in memory accessible on the grid network;
   a first web server comprising a first grid engine for loading and running a first one of the client programs to process one or more of the data sets in response to a first grid compute request from a user program;
   a second web server comprising a second grid engine for loading and running a second one of the client programs to process one or more of the data sets in response to a second grid compute request from a user program; and
   a plurality of grid switches for receiving the first and second grid compute requests and routing the first grid compute request to the first grid engine and the second grid compute request to the second grid engine, wherein the first and second grid engines transmit output from the first and second client programs to at least one of the plurality of grid switches, wherein the plurality of grid switches are for interswitch communication,
   wherein at least one of the plurality of grid switches transmits the output from the first and second client programs to the corresponding requesting user programs as streams and
   wherein the at least one of the plurality grid switches transmits the streams to a grid end point accessible by the corresponding requesting user programs based on a Uniform Resource Locator (URL) opened by the first or second grid engine based on the first or second grid compute request, respectfully.

6. The system of claim 5, wherein the first grid computer request comprises a first Uniform Resource Locator (URL) request string including a name of the first one of the client programs and a path to the first one of the client programs and the second grid computer request comprises a second URL request string including a name of the second one of the client programs and a path to the second one of the client programs.

7. The system of claim 6, wherein the first URL request string further includes a name of a computer device containing the first web server and a path to the first grid engine and the second URL request string further includes a name of a computer device containing the second web server and a path to the second grid engine.

8. The system of claim 5, further comprising a first user device linked to the grid network and running the user program to generate the first grid compute request and second user device linked to the grid network and running the user program to generate the second grid compute request.

9. The system of claim 5, further comprising a public grid domain and a private grid domain, wherein the first grid engine is contained in the public grid domain and the second grid engine is contained in the private grid domain and further wherein the routing performed by at least one of the plurality of grid switches comprises determining that the private grid domain is requested by the second grid compute request and verifying whether the user program corresponding to the second grid compute request can access the private grid domain prior to routing the second grid compute request to the second grid engine.

10. The system of claim 9, wherein the private grid domain is a pay-per-CPU commercial domain and wherein CPU usage to process the second grid compute request is tracked and a financial account corresponding to the second grid compute request is modified to reflect monetary charges associated with the tracked CPU usage.

* * * * *